Aug. 12, 1930.  R. R. DOWNIE  1,772,451
EXCAVATING MACHINE
Filed March 31, 1927
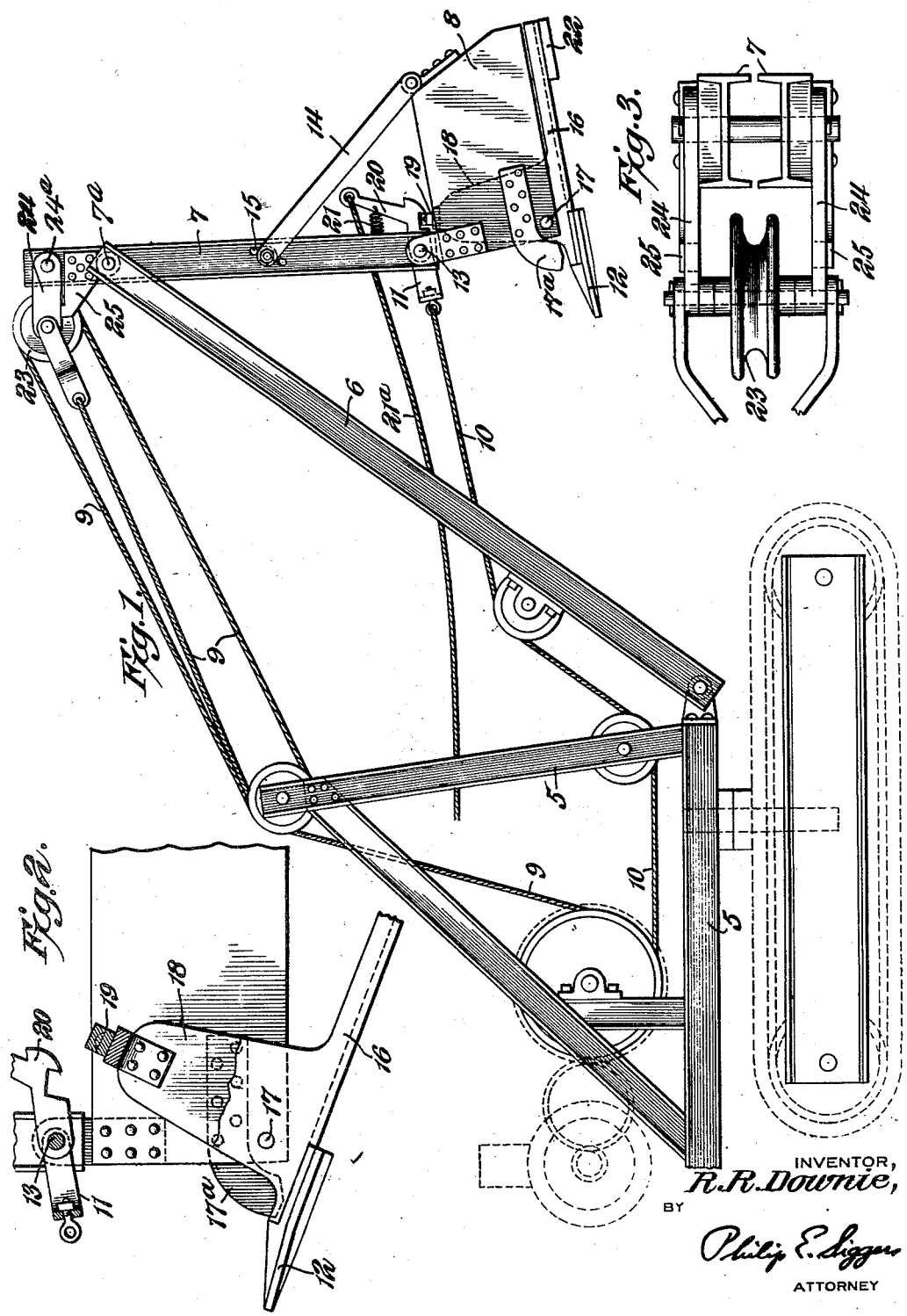
INVENTOR,
R.R. Downie,
BY
Philip E. Liggers
ATTORNEY Patented Aug. 12, 1930

1,772,451

UNITED STATES PATENT OFFICE

ROBERT REX DOWNIE, OF BEAVER FALLS, PENNSYLVANIA, ASSIGNOR TO KEYSTONE DRILLER COMPANY, OF BEAVER FALLS, PENNSYLVANIA, A CORPORATION OF PENNSYLVANIA

EXCAVATING MACHINE

Application filed March 31, 1927. Serial No. 179,836.

This invention relates to excavating machines of the type shown in my prior Patent No. 1,543,250 which issued June 23, 1925.

Among other objects, the invention aims to provide a novel latch for the scoop bottom, and a novel stop for modifying the action of some of the pivoted parts, as fully explained in my prior patent.

Referring to the accompanying drawings, in which the preferred embodiment of the invention is shown:

Figure 1 is an elevation of so much of an excavating machine as is necessary for an understanding of the invention;

Figure 2 is an enlarged elevation, with parts broken away, showing the scoop with its bottom partly open; and Figure 3 is a plan view of the upper end of the ditcher stick, and the sheave carried thereby and the connecting links The drawings show what is known as a "full swing" machine on a caterpillar base, the machine frame 5 pivotally supporting the boom 6 at its lower end, so that the boom may swing in different vertical planes as the frame swings relative to the base. At the outer end of the boom, the ditcher stick 7 is pivoted, the pivot 7ª being near the upper end of the ditcher stick. At the lower end of the ditcher stick, an excavating scoop 8 is secured. Movement of the scoop to excavate material is effected by two power lines 9, 10, the line 9 being secured to the upper end of the ditcher stick by means to be described, while line 10 is connected to the lower end of the ditcher stick by a bail 11.

Obviously as line 9 is drawn in, the boom 6 is elevated at its upper end, carrying the ditcher stick upwardly also. As the line 10 is drawn in, the scoop is drawn toward the machine and may excavate material. If line 9 is drawn in when line 10 is paid out, the scoop is extended until the excavating teeth 12 extend points downward, the position most suitable for starting an excavation. By properly manipulating the two power lines and the swinging machine, the scoop may be put in any position, within the limits of the machine.

The scoop shown is not permanently mounted on the ditcher stick, but is pivoted thereon, as indicated at 13. Preferably the pivotal mounting is such that the scoop may be removed easily for repair or replacement, as scoops are subjected to very severe battering when working in rocky ground. To vary the angle of the teeth 12 relative to the ditcher stick, which is desirable sometimes, the scoop may be swung about the pivots 13, and secured against further movement by braces 14 pivoted to the end of the scoop and adjustably secured to the ditcher stick, as shown at 15.

To dump the material excavated, the scoop 8 has a pivoted bottom 16 (Fig. 2), the pivots 17 of which pass through the sides of the scoop near the open end thereof. Side rake teeth 17ª overhang and protect the pivots 17, and serve to cut a clearance for the sides of the scoop.

Instead of latching the bottom at the closed end of the scoop as shown in earlier patents, the bottom is latched from above so as to minimize the probability of unlatching caused by the momentum of the latch parts and distortion of the scoop when the scoop is used during excavating to deliver heavy blows. As shown, the bottom has side extensions 18 arranged on the inside of the scoop and joined together by a cross-piece 19 with which a latch 20 engages. A strong coil spring 21 tends to keep the latch engaged so that the bottom is held closed until released by a rope 21ª, which is pulled by the operator. The extensions 18 provide, in effect, lever arms by which the latch is enabled to hold the load easily. When the scoop is dropped, as in excavating in rocky ground, the momentum of the extensions 18 tends to close the bottom more tightly and to latch it more securely, as the heavy part of the latch 20 is near its pivot. To overcome any possibly sluggish dumping action of the bottom, a weight 22 may be secured to the free end of the bottom, either on the outside, as shown, or inside the scoop.

The line 9 is connected with the upper end of the ditcher stick by a sheave 23 carried on links 24 which are pivoted to the ditcher stick as at 24ª. If the boom were hoisted very high, as preparatory to dumping in a wagon above the machine, and if the scoop were drawn in toward the machine, the line of pull along the power line 9 would nearly pass through the line of the pivots 7ª, 24ª connecting links 24, the ditcher stick and the boom together. This approximate dead-center position of the parts would make exact positioning or "spotting" of the scoop practically impossible, because any effective pull on line 9 will throw the scoop a considerable distance. To obviate any dead-center or nearly dead-center position of the parts, a stop 25 is used, said stop being secured to the upper end of the ditcher stick, directly above its connection with the boom, and serving to prevent such swinging of links 24 relative to the stick as will make the line of pull of rope 9 pass through or very close to the pivots aforesaid.

Obviously the present invention is not restricted to the particular embodiment thereof herein shown and described. Moreover, it is not indispensable that all the features of the invention be used conjointly, since they may be employed advantageously in various combinations and subcombinations.

What I claim is:

1. In an excavating machine, the combination of a boom mounted to move upwardly and downwardly; a member pivotally connected to the outer end of the boom; a scoop carried by said member; a hoisting line; means connecting the hoisting line to the scoop carrying member at a point above the pivotal connection of the latter to the boom; and means automatically preventing relative motion of said connecting means and the scoop carrying member during a certain part of the operating cycle; said means comprising a stop carried by the scoop carrying member and engaged by the connecting means.

2. An excavating machine comprising, in combination, a swingable boom; a ditcher stick pivotally connected near its upper end to the outer end of the boom; a scoop carried upon the lower end of the ditcher stick; a link which is pivoted to the upper end of the ditcher stick above the pivot which connects the ditcher stick to the boom; a hoisting line connected to the link; a hauling line connected to the scoop; and a stop carried by the ditcher stick above the pivotal connection with the boom and projecting outwardly from the dipper stick and located under the link so as to prevent swinging of said link during a certain portion of the operating cycle of the machine.

3. An excavating machine comprising, in combination, a swingable boom; a ditcher stick pivotally connected near its upper end to the outer end of the boom; a scoop carried upon the lower end of the ditcher stick; a link which is pivoted to the upper end of the ditcher stick above the pivot which connects the ditcher stick to the boom; a sheave on the free end of the link; a hoisting line passing around the sheave; a hauling line connected to the scoop; and a stop rigidly mounted on the ditcher stick between the link and the ditcher stick pivot and so arranged as to support the link in a plane substantially at right angles to the ditcher stick when the ditcher stick is in positions approximating the vertical; the link being free to swing into obtuse angular positions relative to the ditcher stick as the ditcher stick approaches the horizontal.

In testimony, that I claim the foregoing as my own, I have hereto affixed my signature.

ROBERT REX DOWNIE.